(12) United States Patent
Dauberman et al.

(10) Patent No.: US 11,048,899 B2
(45) Date of Patent: Jun. 29, 2021

(54) INTERACTIVE GRAPHIC WALL

(71) Applicant: The Goodyear Tire & Rubber Company, Akron, OH (US)

(72) Inventors: Michael Eric Dauberman, North Canton, OH (US); Seth Barnett Klugherz, Solon, OH (US); Annelie Rode, Boston, MA (US); Brooke Ellen Talbot, Somerville, MA (US); Diana Lee Pun, Quincy, MA (US); Brenton Gentry Eveleth, Somerville, MA (US)

(73) Assignee: The Goodyear Tire & Rubber Company, Akron, OH (US)

( * ) Notice: Subject to any disclaimer, the term of this patent is extended or adjusted under 35 U.S.C. 154(b) by 108 days.

(21) Appl. No.: 16/455,855

(22) Filed: Jun. 28, 2019

(65) Prior Publication Data
US 2020/0410183 A1 Dec. 31, 2020

(51) Int. Cl.
*G06K 7/14* (2006.01)
*G06K 19/06* (2006.01)
*G06F 3/147* (2006.01)

(52) U.S. Cl.
CPC ........... *G06K 7/1417* (2013.01); *G06F 3/147* (2013.01); *G06K 19/06037* (2013.01)

(58) Field of Classification Search
CPC . G06K 7/1417; G06K 19/06037; G06F 3/147
USPC .................................................. 235/462.11
See application file for complete search history.

(56) References Cited

U.S. PATENT DOCUMENTS

| | | | |
|---|---|---|---|
| 5,640,193 | A | 6/1997 | Wellner |
| 5,978,773 | A | 11/1999 | Hudetz et al. |
| 5,979,757 | A | 11/1999 | Tracy et al. |
| 6,141,666 | A | 10/2000 | Tobin |
| 6,199,048 | B1 | 3/2001 | Hudetz et al. |
| 6,993,573 | B2 | 1/2006 | Hunter |
| 7,156,311 | B2 | 1/2007 | Attia et al. |
| 7,387,250 | B2 | 6/2008 | Muni |
| 7,963,441 | B2 | 6/2011 | Emmons et al. |
| 9,047,634 | B2 | 6/2015 | Pappas et al. |
| 9,262,781 | B2 | 2/2016 | Mackinnon Keith |
| 9,824,624 | B2 | 11/2017 | Howard et al. |
| 9,911,377 | B2 | 3/2018 | Howard et al. |

(Continued)

FOREIGN PATENT DOCUMENTS

WO 0233518 A8 2/2003

*Primary Examiner* — Toan C Ly
(74) *Attorney, Agent, or Firm* — Edward T. Kennedy

(57) ABSTRACT

An interactive graphic wall includes a vertical wall that is formed with a plurality of graphical images. Selected graphical images represent activities that are geographically near to a location in which the interactive graphic wall is disposed. A plurality of placards are mounted on the vertical wall, and each one of the placards corresponds to a respective one of the selected graphical images. A machine-readable code is formed on each placard and corresponds to one of the selected graphical images. The code is capable of being read by an imaging device contained in a portable device that is connected to the Internet. When the machine-readable code is read by the imaging device, data in the machine-readable code directs a browser or a software application stored on the portable device to a web site containing information about the activity represented by the respective selected graphical image.

8 Claims, 5 Drawing Sheets

(56) References Cited

U.S. PATENT DOCUMENTS

| | | | |
|---|---|---|---|
| 9,934,506 B2 | 4/2018 | Mackinnon Keith | |
| 10,121,133 B2 | 11/2018 | Nelms et al. | |
| 10,169,626 B2 | 1/2019 | Britt et al. | |
| 10,198,988 B2 | 2/2019 | Howard et al. | |
| 10,204,368 B2 | 2/2019 | Ainsworth, III et al. | |
| 2003/0229446 A1* | 12/2003 | Boscamp | G08G 1/0962 |
| | | | 701/469 |
| 2007/0162350 A1 | 7/2007 | Friedman | |
| 2011/0004533 A1 | 1/2011 | Soto et al. | |
| 2014/0136652 A1* | 5/2014 | Narayanaswami | H04W 4/80 |
| | | | 709/217 |
| 2015/0065171 A1* | 3/2015 | Huilgol | H04L 67/02 |
| | | | 455/456.3 |
| 2018/0025461 A1* | 1/2018 | Kadali | G06Q 90/20 |
| | | | 705/323 |

* cited by examiner

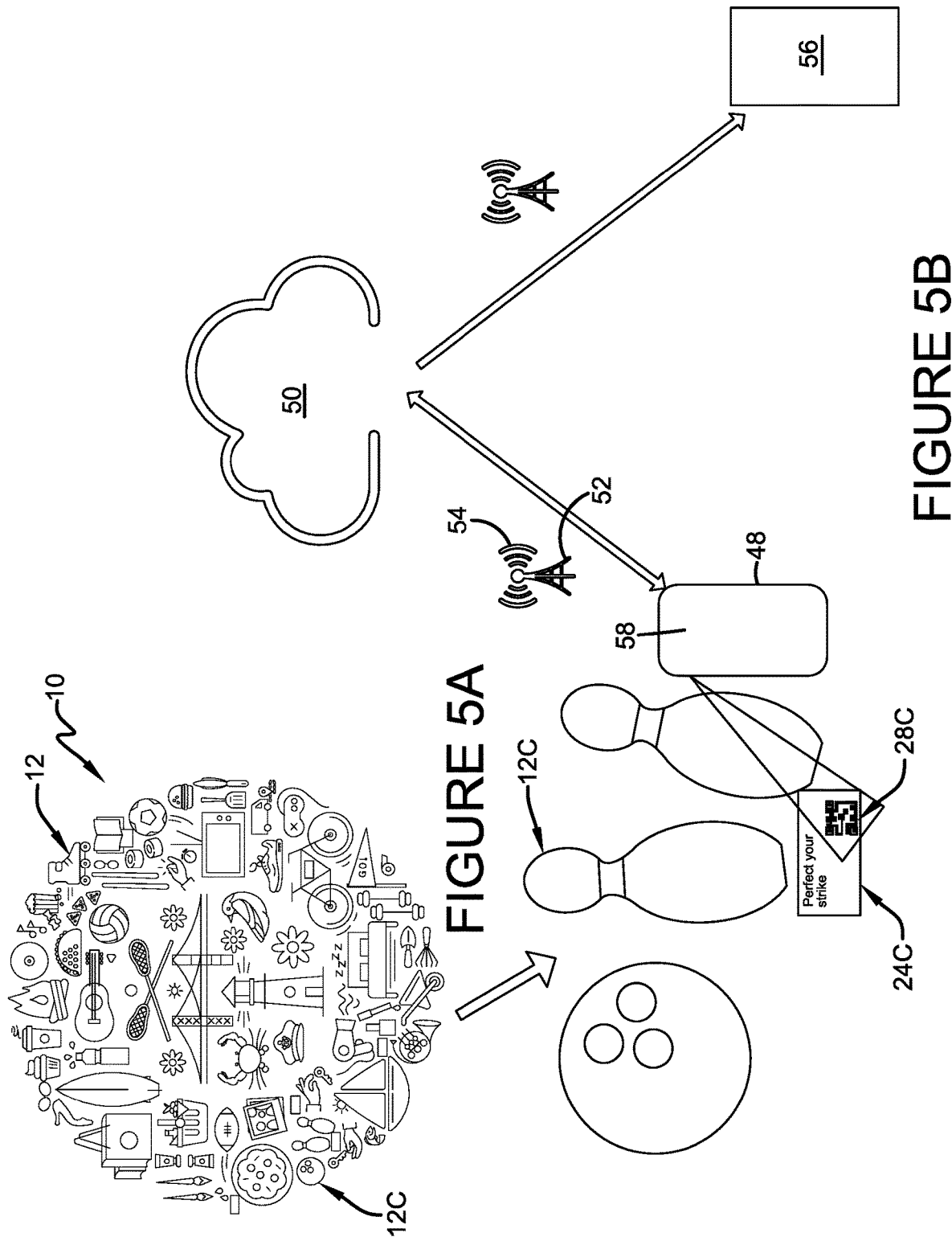

INTERACTIVE GRAPHIC WALL

FIELD OF THE INVENTION

The invention relates to retail activities such as the sale of vehicle tires to a consumer and installation of the tires on the consumer's vehicle. More particularly, the invention is directed to a structure disposed in a retail sale and/or installation location which provides a graphical display of nearby activities that the consumer may utilize while waiting for a service to be performed at the retail location, such as tire installation.

BACKGROUND OF THE INVENTION

Conventional pneumatic tires are designed to perform for relatively long periods of time. Nevertheless, such tires are each formed with a ground-engaging tread that necessarily wears down over the life of the tire. When the tread wears down to a certain level, replacement of the tire is recommended.

In addition, pneumatic tires are subject to air pressure losses due to puncture by nails and other sharp objects, temperature changes, and/or diffusion of air through the tire itself. Such air pressure losses or damage to a tire may lead to a need to replace the tire.

Traditionally, when a consumer has needed to replace one or more tires, the consumer has had to visit a physical tire store that includes a commercial garage with a retail storefront. Once the tires are purchased, they must be installed on the consumer's vehicle, causing the consumer to have to sit in a waiting area while waiting for the installation service to be performed.

More recently, as an alternative, tires have been able to be purchased through the Internet, where consumers can visit certain tire-related web sites. After purchasing tires on such a web site, the consumer typically schedules installation of the tires at a retail or commercial location with a garage. Once again, the consumer must sit in a waiting area while waiting for the installation service to be performed.

Installation of purchased tires on the consumer's vehicle must be performed. However, such waiting in a waiting area for the installation service to be performed can be time consuming and therefore undesirable for the consumer. Such waiting may be even more undesirable when there is a delay in the installation.

As a result, there is a need in the art for a structure disposed in a retail location which provides an easy-to-use display of nearby activities that the consumer may employ while waiting for a service, such as tire installation, to be performed at the retail location.

SUMMARY OF THE INVENTION

According to an aspect of an exemplary embodiment of the invention, an interactive graphic wall includes a vertical wall that is formed with a plurality of graphical images. Selected ones of the graphical images represent activities that are geographically near to a location in which the interactive graphic wall is disposed. A plurality of placards are mounted on the vertical wall in which each one of the placards is adjacent and corresponds to a respective one of the selected graphical images. A machine-readable code is formed on each placard and corresponds to a respective one of the selected graphical images, wherein the code is capable of being read by an imaging device contained in a portable device that is connected to the Internet. When the machine-readable code corresponding to a respective one of the selected graphical images is read by the imaging device, data in the machine-readable code directs at least one of a browser and a software application stored on the portable device to a web site containing information about the activity represented by the respective one of the selected graphical images.

BRIEF DESCRIPTION OF THE DRAWINGS

The invention will be described by way of example and with reference to the accompanying drawings, in which:

FIG. 5A is a reduced front elevational view of the interactive graphic wall shown in FIG. 2; and FIG. 5B is a schematic representation of web-based interaction for nearby activities of the interactive graphic wall shown in FIG. 2.

Similar numerals refer to similar parts throughout the drawings.

DETAILED DESCRIPTION OF THE INVENTION

Turning to FIGS. 1 through 5B, an exemplary embodiment of an interactive graphic wall of the present invention is indicated generally at 10. The interactive graphic wall 10 includes a plurality of different graphical images 12 formed on a vertical wall 14. The vertical wall 14 is disposed in a retail location, which may be a facility such as a retail store for tire sales and/or a tire installation location, including a commercial garage. For the purpose of convenience, reference shall be made to the term retail location with the understanding that this term applies to all such facilities, as well as to retail and installation locations for products other than tires and to services other than tire installation.

Figure 1:
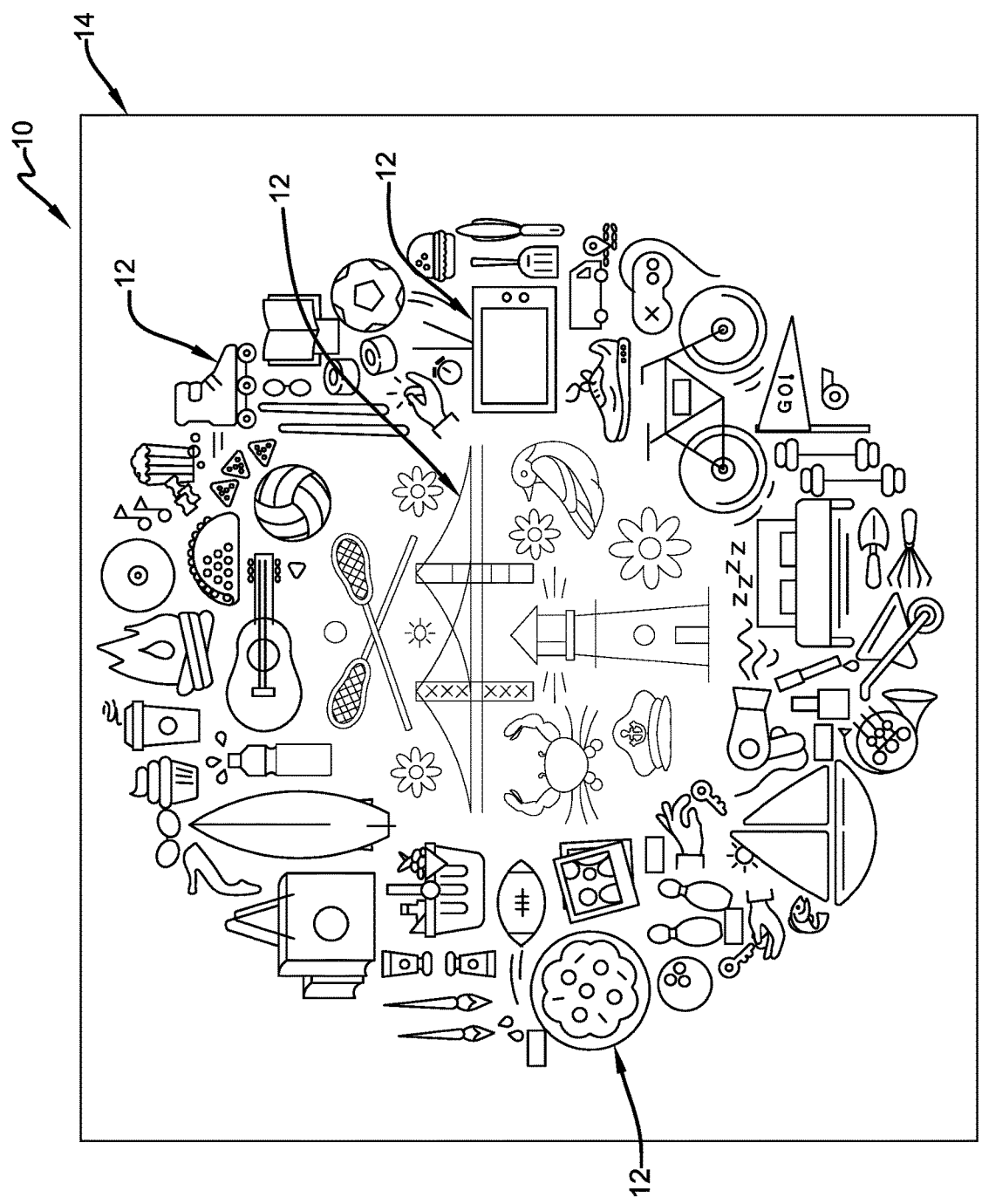
FIG. 1 is a front elevational view of an exemplary embodiment of an interactive graphic wall of the present invention.
Figure 2:
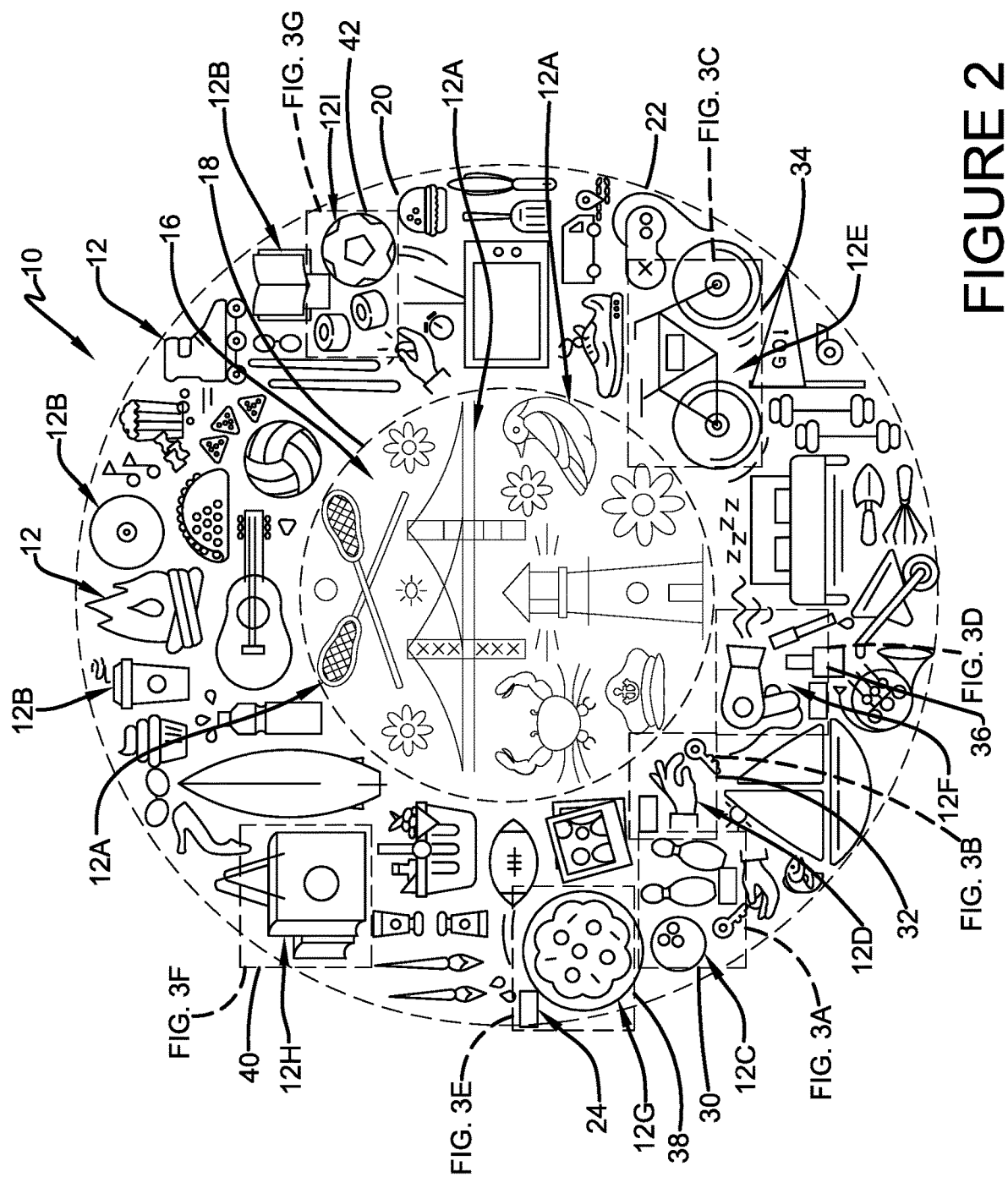
FIG. 2 is a front elevational view of the interactive graphic wall shown in FIG. 2, with particular portions of the wall denoted.

While a consumer is waiting for a service to be performed, such as a tire installation service at the retail location, the interactive graphic wall 10 enables the consumer to locate nearby activities, rather than sitting in a waiting area. Turning to FIGS. 1 and 2, the interactive graphic wall 10 preferably displays the graphical images 12 in a consumer-friendly configuration.

Preferably, a circular configuration is employed. In such a configuration, a central area 16 within a central boundary indicated at 18 is formed with graphical images 12A that represent local activities, sights and/or interests. For example, for a retail location in the geographic region of Maryland, the local graphical images 12A may include: landmarks such as the Chesapeake Bay Bridge and a lighthouse; popular local sporting activities such as lacrosse, represented by lacrosse sticks, and sailing or boating, represented by a captain's hat; local fauna, represented by a crab and the Maryland state bird, which is a Baltimore oriole; local flora, represented by the Maryland state flower, which is a black-eyed susan or *rudbeckia hirta*. Of course, the local graphical images 12A may be adapted to represent landmarks, activities, fauna and/or flora for any specific geographic region.

Surrounding the central area 16 is an outer area 20, which extends between the central boundary 18 and an outer boundary indicated at 22. The outer area 20 is formed with graphical images 12B that represent instructions for use of the interactive graphic wall 10 and/or activities that are geographically near to the retail location in which the interactive graphic wall is disposed. Such activities include dining, leisure activities, sports activities, and the like. Selected ones of the graphical images 12B include a placard 24 (FIG. 4) adjacent each respective image, which preferably bears a caption 26 and a machine-readable code 28 that correspond to the image.

Referring now to FIG. 2 and FIGS. 3A through 3G, seven particular graphical images in the outer area 20 will now be described by way of example. A first selected graphical image 12C is in an area indicated at 30. The first image 12C is of a bowling ball and bowling pins, indicating the activity of bowling. A placard 24C corresponding to the first image 12C is disposed on the vertical wall 14 (FIG. 1) adjacent the image. The placard 24C preferably includes a caption or title 26C that relates to or describes the activity of bowling, while a machine-readable code 28C includes further information, as will be described below.

A second selected graphical image 12D is in an area indicated at 32. The second image 12D is of a hand dropping off a key, indicating an instruction of using the interactive graphic wall 10 while leaving a vehicle for servicing. A placard 24D corresponding to the second image 12D is disposed on the vertical wall 14 adjacent the image. The placard 24D preferably includes a caption or title 26D that relates to or describes the instructions for leaving the vehicle for servicing and using the interactive graphic wall 10 to locate nearby activities, while a machine-readable code 28D includes further information to be described below.

A third selected graphical image 12E is in an area indicated at 34. The third image 12E is of a bicycle, indicating the activity of working out at a gym. A placard 24E preferably includes a caption or title 26E that relates to or describes the activity of working out, while a machine-readable code 28D includes further information, again as will be described below.

Likewise, a fourth selected graphical image 12F is in an area indicated at 36 and includes a hair dryer and nail polish, indicating the activity of attending a salon, with a placard 24F corresponding to the image and bearing a caption 24F relating to the activity and a machine-readable code 28F with further information; a fifth selected graphical image 12G is in an area indicated at 38 and includes a pizza, indicating the activity of eating or dining, with a placard 24G corresponding to the image and bearing a caption 24G relating to the activity and a machine-readable code 28G with further information; a sixth selected graphical image 12H is in an area indicated at 40 and includes a shopping bag, indicating the activity of shopping, with a placard 24H corresponding to the image and bearing a caption 24H relating to the activity and a machine-readable code 28H with further information; and a seventh selected graphical image 12I is in an area indicated at 42 and includes a soccer ball, indicating the activity of playing a sport, with a placard 24I corresponding to the image and bearing a caption 24I relating to the activity and a machine-readable code 28I with further information.

It is to be understood that the specific number of graphical images 12 formed on the interactive graphic wall 10 depends on the particular size of the vertical wall 14 and the number of graphical images to be displayed. In addition, any number of the graphical images 12 may be selected for interactivity through the use of the placard 24 bearing the machine-readable code 28. It is to be further understood that the placard 24 may be of any known form, including printed form or electronic/digital form.

Figure 4:
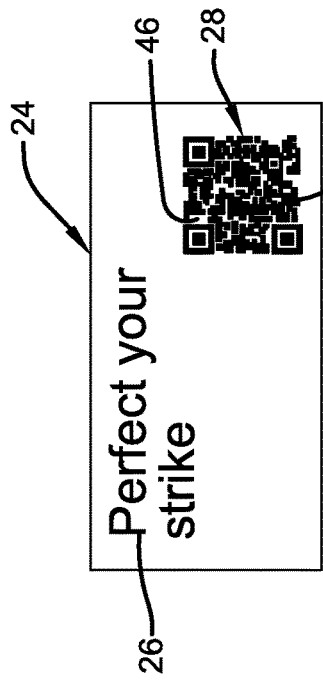
FIG. 4 is an enlarged front elevational view of an exemplary placard employed on the interactive graphic wall shown in FIG. 2.
Figure 3C:
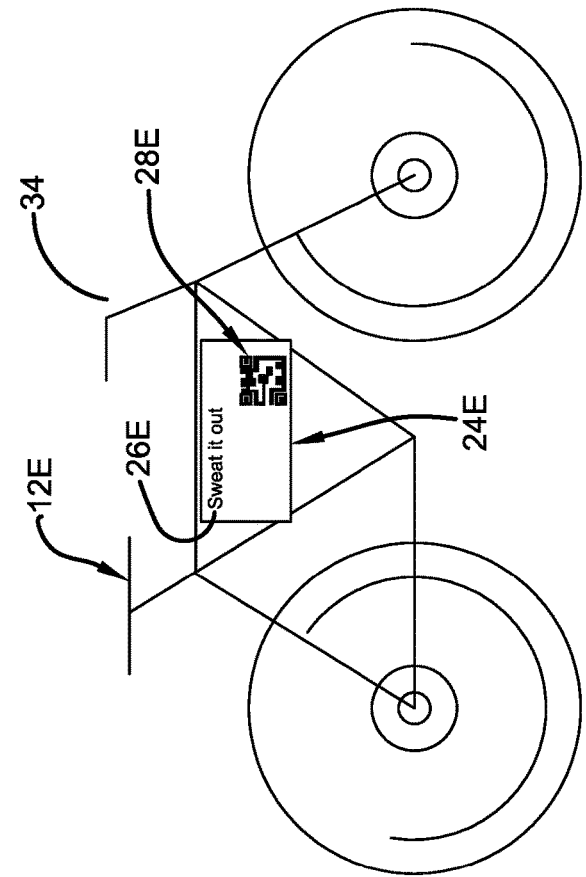
FIG. 3C is an enlarged front elevational view of a third portion of the interactive graphic wall shown in FIG. 2.
Figure 3A:
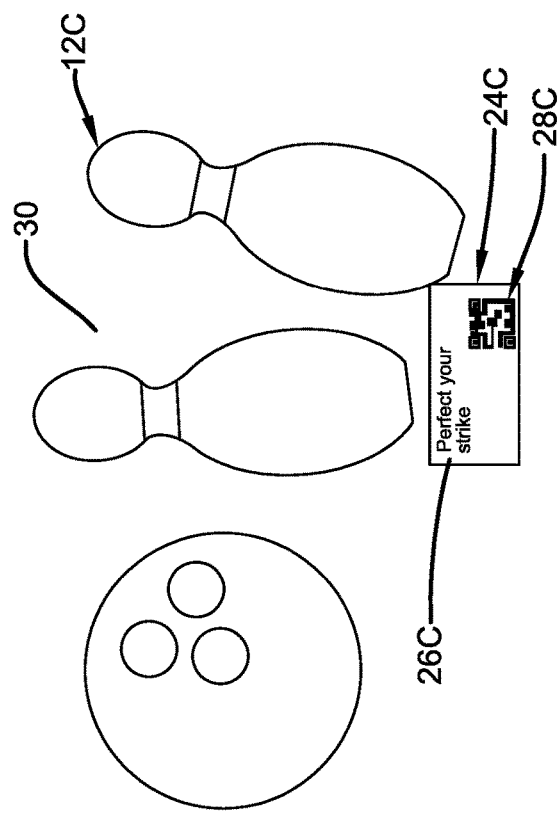
FIG. 3A is an enlarged front elevational view of a first portion of the interactive graphic wall shown in FIG. 2.
Figure 3B:
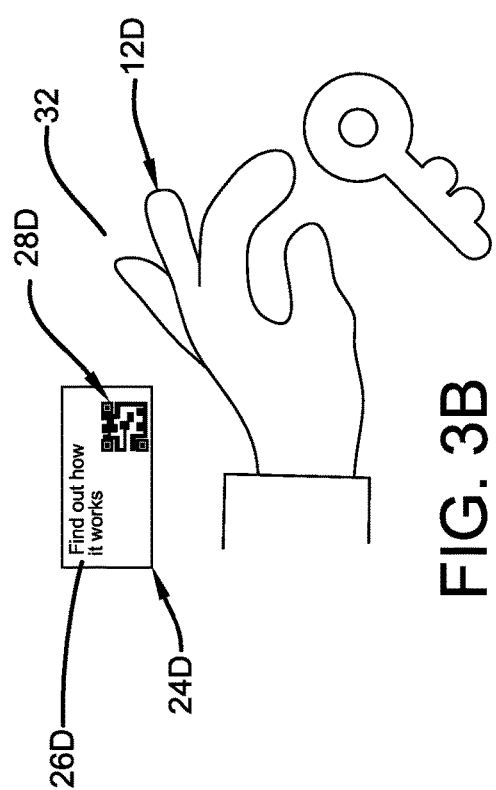
FIG. 3B is an enlarged front elevational view of a second portion of the interactive graphic wall shown in FIG. 2.
Figure 3D:
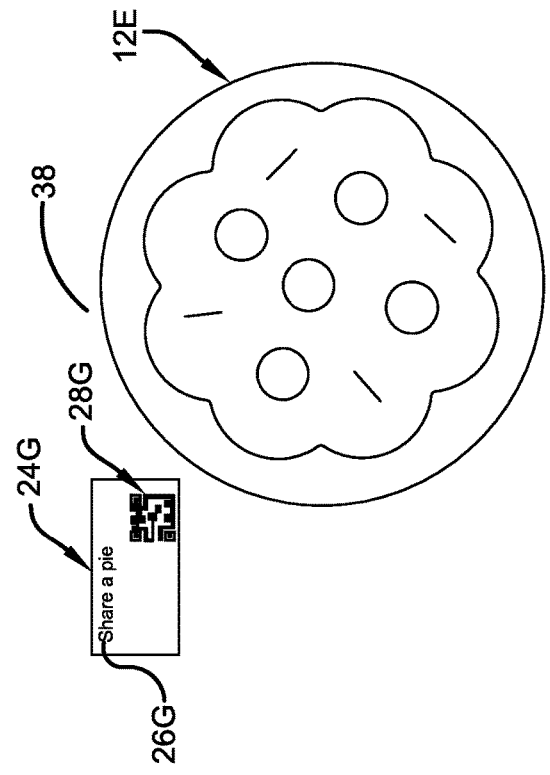
FIG. 3D is an enlarged front elevational view of a fourth portion of the interactive graphic wall shown in FIG. 2.
Figure 3F:
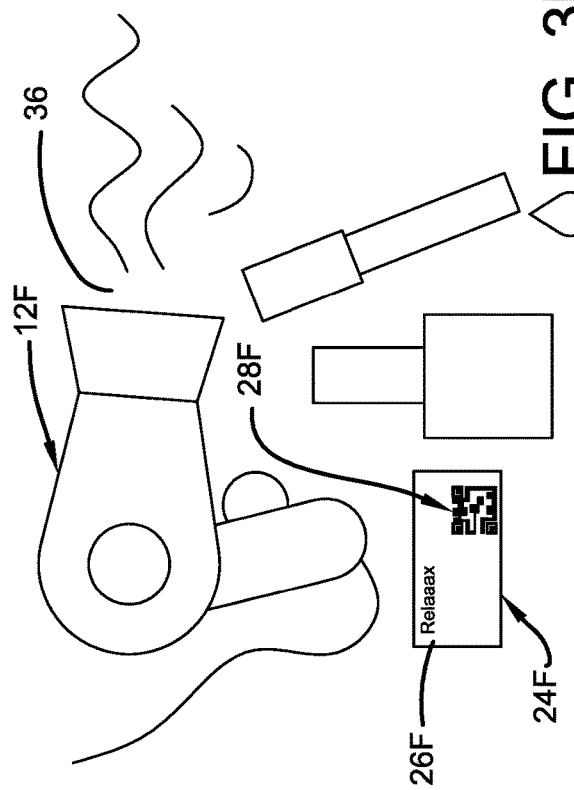
FIG. 3F is an enlarged front elevational view of a sixth portion of the interactive graphic wall shown in FIG. 2.
Figure 3E:
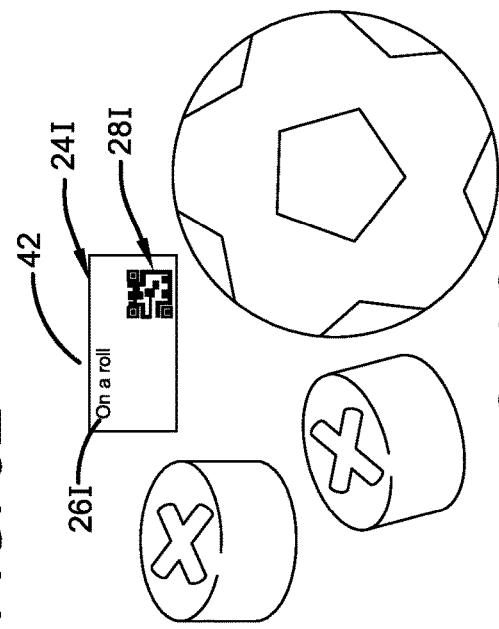
FIG. 3E is an enlarged front elevational view of a fifth portion of the interactive graphic wall shown in FIG. 2.
Figure 3G:
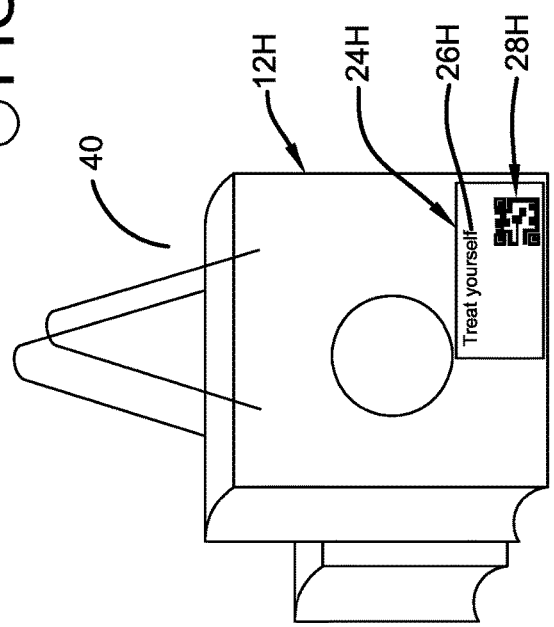
FIG. 3G is an enlarged front elevational view of a seventh portion of the interactive graphic wall shown in FIG. 2.

With additional reference to FIG. 4, the interactivity of the interactive graphic wall 10 is provided by the machine-readable codes 28 that are adjacent respective selected graphical images 12. Each machine-readable code 28 may be a bar code or a quick response (QR) code. The code 28 shown in FIGS. 3A through 4 by way of example is a QR code, which is a unique graphical code that stores data in patterns of dark squares 44 that are arranged in a grid on a light background 46.

Turning to FIGS. 5A and 5B, using the first selected graphical image 12C by way of example, the QR code 28C on the placard 24C adjacent the selected graphical image is electronically read by an imaging device, such as a camera, contained in a mobile or portable device 48. Exemplary portable devices 48 include a consumer's mobile or cellular phone, a consumer's tablet computer, and/or a tablet computer that may be provided in the proximity of the interactive graphic wall 10.

The QR code 28C thus is electronically read or scanned using the portable device 48, and is processed to interpret the image. Data is extracted from patterns in the image of the code 28C by software that is stored on or accessed by the portable device 48. Preferably, the portable device 48 includes a software application, known as an app, which enables a web browser or another app to open on the portable device.

As is known to those skilled in the art, the portable device 48 is connected to the Internet 50. For example, the portable device 48 may include an antenna that electronically communicates with a cell tower 52 through radio waves 54, thereby facilitating the connection of the portable device to the Internet 50. A wireless fidelity (Wi-Fi) network may also be employed in the proximity of the interactive graphic wall 10 to facilitate connection of the portable device 48 to the Internet 50.

Using the connection of the portable device 48 to the Internet 50, the web browser or app on the portable device is directed by the data in the QR code 28C to a web site 56 that contains information about the activity in the respective selected graphical image 12C. The information is shown on a display 58 of the portable device 48, enabling the consumer to view such information about the activity. For example, the web site 56 may include a review service or map service which provides a venue description, geographic location, distance information, directions, and/or rating information for the activity in the selected graphical image 12C.

The interactive graphic wall 10 and the graphical images 12 with interactive machine-readable codes 28 thus enable a consumer to learn about a nearby selected activity. Upon choosing an activity, the consumer can walk, take public transportation or take private transportation, such as a ride-sharing service, to the venue for the activity. The consumer can thus participate in an activity of his or her choosing while a service, such as tire installation, is being performed, rather than sitting in a waiting area.

In this manner, the interactive graphic wall 10 of the present invention integrates a graphical display of activities that are near a retail location in which the wall is disposed with a convenient way to gather information about those activities. Selected graphical images 12 on the interactive graphic wall 10 each include a respective machine-readable code 28 that directs a portable device 48, such as the consumer's mobile phone, to a web site 56 with information about the activity which corresponds to each image. Such a structure enables a consumer to choose and participate in a nearby activity while waiting for a service to be performed at the retail location.

The present invention also includes a method of providing a graphical display of nearby activities that a consumer may utilize while waiting for a service to be performed at a retail location. The method includes steps in accordance with the description that is presented above and shown in FIGS. 1 through 5B.

It is to be understood that the structure of the above-described interactive graphic wall 10 may be altered or rearranged, or components or steps known to those skilled in the art omitted or added, without affecting the overall concept or operation of the invention. For example, any number of graphical images 12 or arrangement of graphical images on the vertical wall 14 may be employed without affecting the overall concept or operation of the invention.

The invention has been described with reference to a preferred embodiment. Potential modifications and alterations may occur to others upon a reading and understanding of this description. It is to be understood that all such modifications and alterations are included in the scope of the invention as set forth in the appended claims, or the equivalents thereof.

What is claimed is:

1. An interactive graphic wall, comprising:
   a vertical wall being formed with a plurality of non-digital graphical images, the vertical wall being disposed in a retail location;
   the graphical images being arranged in a circular configuration;
   the circular configuration being formed with a central area including local graphical images representing at least one of local activities, local sights, and local interests;
   selected ones of the graphical images representing activities being geographically near and external to the retail location in which the interactive graphic wall is disposed;
   the selected ones of the graphical images representing activities being disposed in an outer area surrounding the central area;
   a plurality of placards being mounted on the vertical wall, each one of the placards being adjacent and corresponding to a respective one of the selected graphical images;
   a machine-readable code formed on each placard and corresponding to a respective one of the selected graphical images, wherein the code is capable of being read by an imaging device contained in a portable device that is connected to the Internet; and
   whereby when the machine-readable code corresponding to a respective one of the selected graphical images is read by the imaging device, data in the machine-readable code directs at least one of a browser and a software application stored on the portable device to a web site containing information about the activity represented by the respective one of the selected graphical images.

2. The interactive graphic wall of Claim 1, wherein the local graphical images include at least one of landmarks, sporting activities, fauna, and flora.

3. The interactive graphic wall of claim 1, wherein the selected ones of the graphical images representing activities include at least one of dining, leisure activities, and sports activities.

4. The interactive graphic wall of claim 1, wherein each placard includes a caption relating to the activity represented by the corresponding one of the selected graphical images.

5. The interactive graphic wall of claim 1, wherein the machine-readable code includes at least one of a bar code and a quick response code.

6. The interactive graphic wall of claim 1, wherein the portable device includes at least one of a mobile phone and a tablet computer.

7. The interactive graphic wall of claim 1, wherein the web site provides at least one of a venue description, geographic location, distance information, directions, and rating information for a venue of the activity represented by the respective one of the selected graphical images.

8. The interactive graphic wall of claim 1, further comprising a selected one of the graphical images representing instructions for use of the interactive graphic wall.

* * * * *